(12) United States Patent
Lu et al.

(10) Patent No.: US 12,123,459 B1
(45) Date of Patent: Oct. 22, 2024

(54) COMBINABLE MULTI-AXIS STRUCTURE AND LINEAR MOTION PLATFORM HAVING THE STRUCTURE

(71) Applicant: WUXI XIVI SCIENCE AND TECHNOLOGY CO., LTD., Wuxi (CN)

(72) Inventors: Minjie Lu, Wuxi (CN); Hengyu Shen, Wuxi (CN)

(73) Assignee: WUXI XIVI SCIENCE AND TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 18/641,456

(22) Filed: Apr. 22, 2024

Related U.S. Application Data

(63) Continuation of application No. PCT/CN2024/079803, filed on Mar. 4, 2024.

(30) Foreign Application Priority Data

Oct. 18, 2023 (CN) ......................... 2023113456383.4

(51) Int. Cl.
*F16C 29/02* (2006.01)
*F16C 29/00* (2006.01)

(52) U.S. Cl.
CPC .......... *F16C 29/025* (2013.01); *F16C 29/002* (2013.01); *F16C 29/008* (2013.01)

(58) Field of Classification Search
CPC .... F16C 29/002; F16C 29/008; F16C 29/025; F16C 29/12; F16C 29/123; F16C 32/0614; F16C 32/0622; F16C 32/0662; F16C 32/067; F16C 32/0674; F16C 32/0677; B23Q 1/38
See application file for complete search history.

(56) References Cited

U.S. PATENT DOCUMENTS

| | | |
|---|---|---|
| 2005/0211920 A1 | 9/2005 | Shibata |
| 2013/0130734 A1 | 5/2013 | Rice et al. |
| 2016/0317040 A1 | 11/2016 | Russell et al. |
| 2020/0158174 A1* | 5/2020 | Li ........................... B23Q 1/706 |
| 2021/0181639 A1* | 6/2021 | Linssen ................. F16C 29/025 |
| 2022/0413396 A1* | 12/2022 | Miyao ................. G03F 7/70816 |

FOREIGN PATENT DOCUMENTS

| | | | |
|---|---|---|---|
| CN | 103062313 A | | 4/2013 |
| CN | 103064431 A | | 4/2013 |
| CN | 116857284 A | * | 10/2023 |
| WO | WO-0187536 A1 | * | 11/2001 | ............... B23Q 1/38 |

* cited by examiner

*Primary Examiner* — Alan B Waits
(74) *Attorney, Agent, or Firm* — True Shepherd LLC; Andrew C. Cheng

(57) ABSTRACT

A combinable multi-axis structure comprises: a first air-bearing track, and a plurality of second air-bearing tracks arranged in parallel and fitted with a plurality of air-bearing tables capable of moving in a length direction of the plurality of second air-bearing tracks, wherein, a plurality of mounting holes are arranged in the plurality of air-bearing tables, and the first air-bearing track is provided with a plurality of fasteners corresponding to and fitted with the plurality of mounting holes to connect the first air-bearing track and the plurality of air-bearing tables. An object of the present disclosure is to provide the combinable multi-axis structure having high stability, precision and impact absorptivity, and the linear motion platform having the structure.

6 Claims, 11 Drawing Sheets

COMBINABLE MULTI-AXIS STRUCTURE AND LINEAR MOTION PLATFORM HAVING THE STRUCTURE

CROSS-REFERENCE TO RELATED APPLICATIONS

This application is a continuation of International Patent Application No. PCT/CN2024/079803 with a filing date of Mar. 4, 2024, designating the United States, now pending, and further claims priority to Chinese Patent Application No. 202311345638.4 with a filing date of Oct. 18, 2023. The content of the aforementioned applications, including any intervening amendments thereto, are incorporated herein by reference.

TECHNICAL FIELD

The present disclosure belongs to the technical field of precision instruments, and in particular relates to a combinable multi-axis structure and a linear motion platform having the structure.

BACKGROUND ART

In some precision measuring mechanical instruments, because of their measuring characteristics, a working platform needs to have a function for large-range movement, and also a function for high-resolution and high-precision fine adjustment. Currently, large-range movements of existing high-precision platforms are all based on lead screw drive, gear and gear spindle drive, linear guideways, and the like. The gear and gear spindle drive is a traditional mechanical drive mode having a low positioning accuracy. The lead screw drive has a higher positioning accuracy than the gear and gear spindle drive, but results in quicker wearing because the drive mainly relies on friction. The linear guideways have advantages such as high precisions and strong bearing capacities, so currently the most commonly used drive mode for a high-precision linear motion platform is a ball linear guideway, but this drive mode has high mounting requirements, maintenance complexity and costs.

In the prior art, for example, there is an disclosure patent named "AEROSTATIC STAGE AND GAP ADJUSTING METHOD THEREOF", the publication number of which is TW201721032A. The disclosure relates to an aerostatic stage and a gap adjusting method thereof, wherein, the aerostatic stage includes a stage, a track and an electromagnet; the stage is arranged on the track; an aerostatic bearing of the stage is used for delivering air to the track, so that the stage is air-born above the track, with a longitudinal distance between a carrier of the stage and the track; and the electromagnet is arranged on one of the carrier and the track, so that a magnetic-field intensity of the electromagnet is changed to reduce the longitudinal distance between the carrier and the track, thereby improving stability of the stage moving on the track. The disclosure has weak stability and low precision.

SUMMARY OF THE PRESENT INVENTION

An object of the present disclosure is to provide a combinable multi-axis structure having high stability, precision and impact absorptivity, and a linear motion platform having the structure.

To achieve the above object, the present disclosure adopts the following technical solutions.

A combinable multi-axis structure includes: a first air-bearing track, and a plurality of second air-bearing tracks arranged in parallel and fitted with a plurality of air-bearing tables capable of moving in a length direction of the plurality of second air-bearing tracks, wherein, a plurality of mounting holes are arranged in the plurality of air-bearing tables, and the first air-bearing track is provided with a plurality of fasteners corresponding to and fitted with the plurality of mounting holes to connect the first air-bearing track and the plurality of air-bearing tables.

Through the overall design of the combinable multi-axis structure, the first air-bearing track and the plurality of air-bearing tables are connected through the plurality of fasteners. Because of the plurality of second air-bearing tracks arranged in parallel, the first air-bearing track can be driven by the plurality of air-bearing tables to move in the length direction of the plurality of second air-bearing tracks. The plurality of second air-bearing tracks can achieve a more stable movement of the first air-bearing track, prevent an unsupported part in the middle of the first air-bearing track from bending downwards under the action of gravity, and ensure levelness of the first air-bearing track, thereby achieving stability and high precision of a movement of an air-bearing table on the first air-bearing track. The fasteners are used for connecting to the mounting holes correspondingly, so as to achieve fastening connections between the first air-bearing track and the air-bearing tables and improve stability of the first air-bearing track.

According to an embodiment of the present disclosure, a vibration-absorbing assembly is arranged in each mounting hole and includes a first housing, the first housing is provided with an opening at a top thereof and a second sealing plate at a middle part therein, the second sealing plate divides the first housing into a first cavity and a second cavity from top to bottom, a moving plate is arranged at a bottom surface of the second sealing plate, a supporting rod is vertically arranged on an inner bottom side of the second housing [sic], and a through hole fitted with and used for housing the supporting rod is arranged in the moving plate; and a connecting column is arranged on a top surface of the second sealing plate, and an assembly is arranged on a top side of the connecting column and used for connecting to the fastener.

According to an embodiment of the present disclosure, a top side of the first housing is flush with a surface of the first air-bearing track, and a top side of the assembly protrudes from a top surface of the air-bearing table.

Through the design of the vibration-absorbing assembly, the second sealing plate can make the inside of the second cavity a closed space, and a top of the first cavity communicates with the outside. Since the assembly is connected to the fastener, the first air-bearing track that is vibrated or changed in weight transmits the vibration or impact to the assembly through the fastener, and the vibration or impact is transmitted from the assembly to the second sealing plate along the supporting rod. It should be noted that, since the second sealing plate is made of a flexible material, the second sealing plate changes its own shape under the vibration or impact to cooperate with the vibration or impact, that is, the second sealing plate moves up and down with the vibration or impact, and the second cavity as the closed space applies an opposite force to the second sealing plate to absorb the vibration or impact on the second sealing plate. In this process, the moving plate that is arranged at a bottom side of the second sealing plate moves with the second sealing plate. Since the through hole that is fitted with the supporting rod is arranged in the moving plate, the fitting between the supporting rod and the through hole can maintain levelness of the moving plate, and keep a horizontal position and the levelness stable while the moving plate is moving up and down with the second sealing plate, thereby ensuring that the second sealing plate only moves axially along the supporting rod. Thus, the assembly is not displaced horizontally or changed in levelness while moving up and down. The above design can achieve the stability and levelness of the first air-bearing track, ensure that the vibration or impact generated by the first air-bearing track can be absorbed by the buffer assembly while the first air-bearing track is moving and when an object is placed on the air-bearing table of the first air-bearing track, and ensure the levelness of the first air-bearing track. At the same time, the vibration or impact generated by the first air-bearing track can be prevented from being continuously transmitted downwards, that is, the vibration or impact of the first air-bearing track can be prevented from affecting the stability of the air-bearing table, so that the stability and precision of the whole device can be improved.

Since the top side of the first housing is flush with the surface of the first air-bearing track, and the top side of the assembly protrudes from the air-bearing table, a certain buffer space can be achieved during the movement or vibration of the first air-bearing track.

According to an embodiment of the present disclosure, a first sealing plate made of a flexible material is arranged on a top side of the first cavity.

Through the above design, the first sealing plate is used for sealing the first cavity to prevent impurities or dirt from entering the first cavity from the opening at the top of the first cavity in the process of absorbing the impact in the second cavity, thereby keeping the inside of the first cavity clean, avoiding a damage to the second sealing plate in a working process, and protecting the second sealing plate. Meanwhile, the flexible structure of the first sealing plate can prevent the vibration or impact from being transmitted to the first housing.

According to an embodiment of the present disclosure, a buffer ring body is arranged on the top side of the first housing and around the assembly, and a plurality of buffer pads are arranged on both upper and lower surfaces of the buffer ring body.

Since the connection between the fastener and the assembly cannot effectively ensure that a bottom surface of the first air-bearing track completely fits an upper surface of the air-bearing table, there are possibilities of a gap and looseness. Through the above design, the plurality of buffer pads that are arranged on both upper and lower sides of the buffer ring body abut against the top side of the first housing and the bottom surface of the first air-bearing track, respectively, and the buffer ring body can act to tension and fill the gap. At the same time, a hole in the middle of the buffer ring body limits displacement ranges, that is, movement ranges, of the fastener and the assembly, and also limits a shaking range of the first air-bearing track, so that the buffer ring body can ensure coaxiality between the fastener and the assembly and ensure that the fastener and the assembly remain vertical continuously in the assembled state. At the same time, since the first sealing plate is flexible, the first sealing plate is driven to be displaced when the fastener and the assembly are displaced. Thus, the deformed first sealing plate can further limit the displacement of the fastener and the assembly, and the first sealing plate that is deformed towards an inner wall direction of the buffer ring body can further improve the limiting effects on the fastener and the assembly.

According to an embodiment of the present disclosure, a plurality of air-bearing assemblies are arranged on sides of the plurality of air-bearing tables opposite to the plurality of second air-bearing tracks, and each air-bearing assembly includes two air bearings arranged oppositely and provided with a magnetic-absorbing assembly therebetween; and the magnetic-absorbing assembly includes a rack body and a magnetic absorber arranged at a middle part of the rack body, and both sides of the rack body are connected to the air bearings through connectors.

Through the above design, the air bearings for the magnetic-absorbing assembly are paired, and the magnetic-absorbing assembly is arranged between opposite sides of the two air bearings. The paired air bearings are used for delivering air. The second air-bearing track can be fitted with the magnetic-absorbing assembly to provide a magnetic preload effect, so that the magnetic-absorbing assembly drives the air-bearing assembly to fit the second air-bearing track. In this process, interaction forces between the magnetic-absorbing assembly and the air bearings counterbalance each other to ensure improved stability of airflows delivered from the air bearings on both sides of the magnetic-absorbing assembly and to ensure stable distances between the air bearings on both sides and the second air-bearing track. The air bearings on both sides of the magnetic-absorbing assembly are arranged symmetrically to further improve the stability. The magnitude of a magnetic force generated by the magnetic absorber can be adjusted to change the magnitude of a suction force between the air-bearing assembly and the second air-bearing track, thereby adjusting the distances between the air bearings and the second air-bearing track.

According to an embodiment of the present disclosure, each connector includes a first connecting block and a second connecting block that are rotationally connected through an elastic oscillator, the first connecting block is connected to the air bearing, and the second connecting block is connected to the rack body.

When each air bearing works, the pressure and airflow of the air delivered from the air bearing are changed to some extent. In this process, since the first connecting block and the second connecting block are connected to the air bearing and the rack body, respectively, when the air delivered from the air bearing changes, the air bearing is displaced to be closer or farther away. Through an interaction between the magnetic-absorbing assembly and the second rack body [sic], the rack body is not moved greatly with the displacement of the air bearing, but is relatively stable in a spatial position. At the same time, according to the elasticity of the elastic oscillator, the air bearing tends to return to an original position. Thus, when the pressure and airflow of the air delivered from the air bearing are changed, the position of the air bearing can be restrained and stabilized to improve the precision and stability of the whole device.

According to an embodiment of the present disclosure, the magnetic-absorbing assembly further includes a limiter including two enclosure racks arranged oppositely, a connecting plate is connected to opposite sides of the two enclosure racks, and a flexible plate is arranged on one side of the connecting plate close to the second air-bearing track; and outer ends of the enclosure racks are connected to the rack body.

Through the above design, the flexible plate can limit the air discharged from the air bearing. That is, when the air bearing works, since the air bearing is constantly delivering the air outwards, the flexible plate can limit or interfere with a movement of the air generated by the air bearing on one side towards the air bearing on the other side when the air is passing through the magnetic absorber. This avoids the problem that the airflows from the two air bearings collide with each other, causing an excessive local pressure and therefore causing unstable and changing distances between the air bearings and the first and second tracks. At the same time, the design of the flexible plate can avoid the situation that when the air bearings stop air delivery, the magnet is directly adsorbed on the surfaces of the first and second air-bearing tracks, thereby easily causing the worn track surfaces.

A linear motion platform having the above combinable multi-axis structure can have high stability, precision and impact absorptivity. At the same time, the plurality of second air-bearing tracks is adopted to achieve a multi-axis mode, thereby ensuring the stability of the first air-bearing track. In addition, the first air-bearing track and the air-bearing tables located on the second air-bearing tracks can achieve the combinable structure to improve convenience of the whole device in a transportation process.

Further, a suction substrate is arranged at each end of the first air-bearing track and the second air-bearing track, and an air pipe is connected to one side of the suction substrate and to an external air pump. The air pump can cause the suction substrate to suck the air on the surfaces of the first air-bearing track and the second air-bearing track, thereby achieving the effect of cleaning the surfaces of the first air-bearing track and the second air-bearing track, and meanwhile increasing fluidity of the air on the surfaces of the first air-bearing track and the second air-bearing track to avoid the problem that the fluidity of the air on the surfaces of the first air-bearing track and the second air-bearing track are decreased to result in slight fluctuations in the height and speed of the air-bearing table during a movement. In addition, the suction substrate can limit a sliding range of the air-bearing table on the first air-bearing track or the second air-bearing track, and prevent the air-bearing table from sliding out of a movable range on the first air-bearing track or the second air-bearing track.

Figure 1:
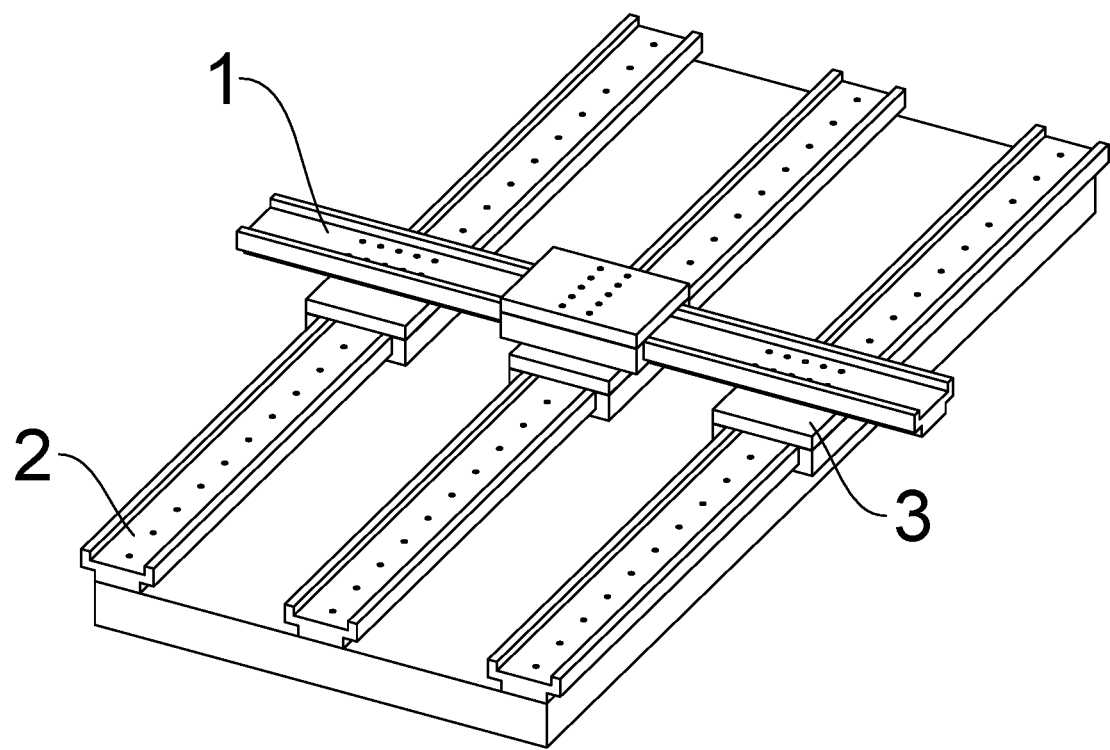
FIG. 1 is a schematic perspective view of a linear motion platform.

Reference numerals: first air-bearing track 1, fastener 11, second air-bearing track 2, air-bearing assembly 21, air bearing 22, magnetic-absorbing assembly 23, rack body 231, magnetic absorber 232, connector 24, first connecting block 241, second connecting block 242, elastic oscillator 243, limiter 25, enclosure rack 251, connecting plate 252, flexible plate 253, air-bearing table 3, mounting hole 31, vibration-absorbing assembly 32, first housing 321, second sealing plate 322, first cavity 323, second cavity 324, moving plate 325, supporting rod 326, through hole 327, connecting column 328, assembly 329, first sealing plate 33, buffer ring body 34, buffer pad 341, suction substrate 4, and air pipe 41.

DESCRIPTION OF EMBODIMENTS

The technical solutions of the present disclosure will be further described below in detail in conjunction with specific embodiments and accompanying drawings.

Embodiment 1

Figure 2:
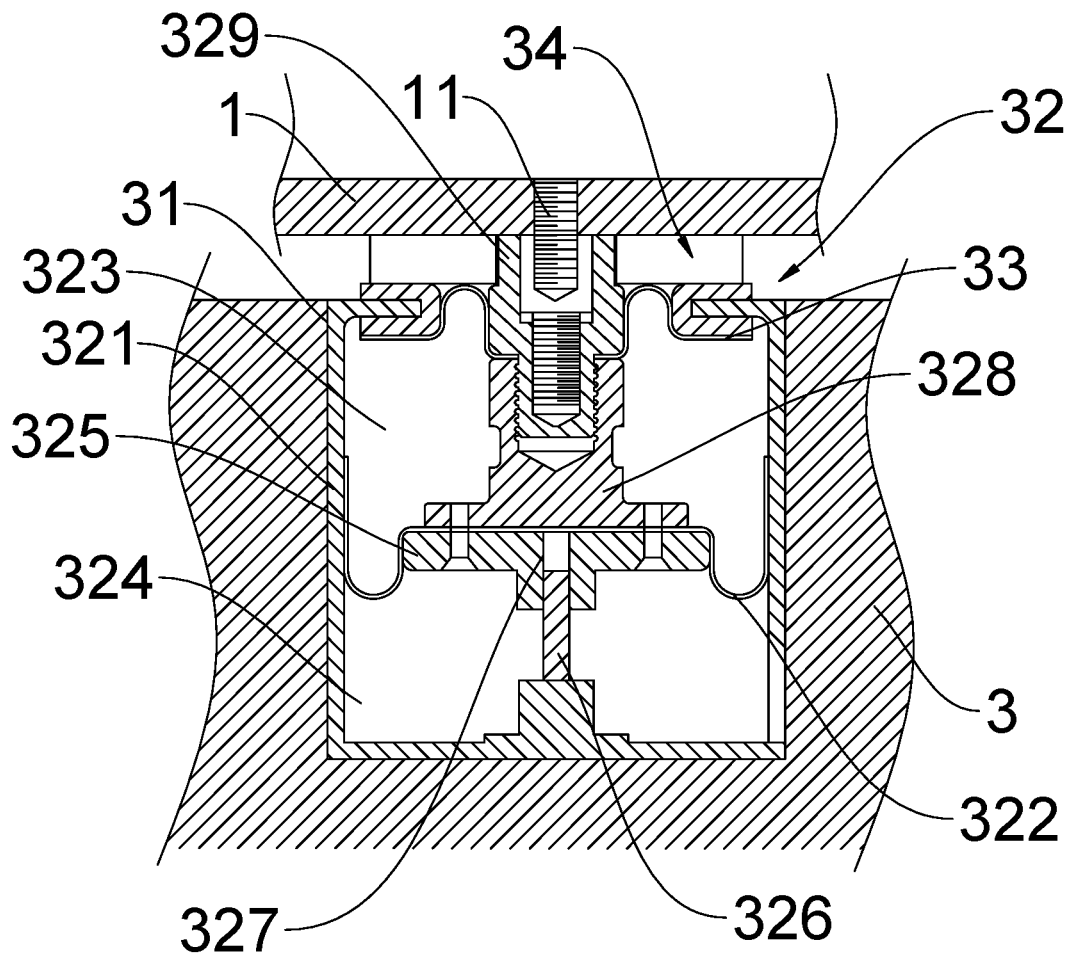
FIG. 2 is a schematic view of fitting between a first air-bearing track and an air-bearing table.
Figure 3:
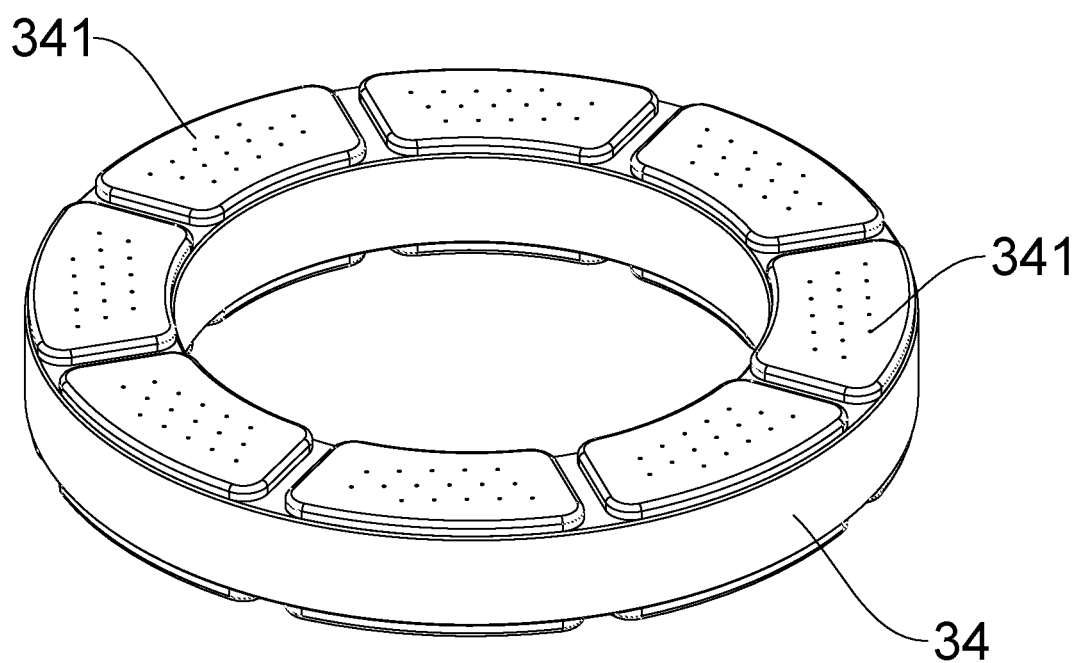
FIG. 3 is a schematic perspective view of a buffer ring body.
Figure 4:
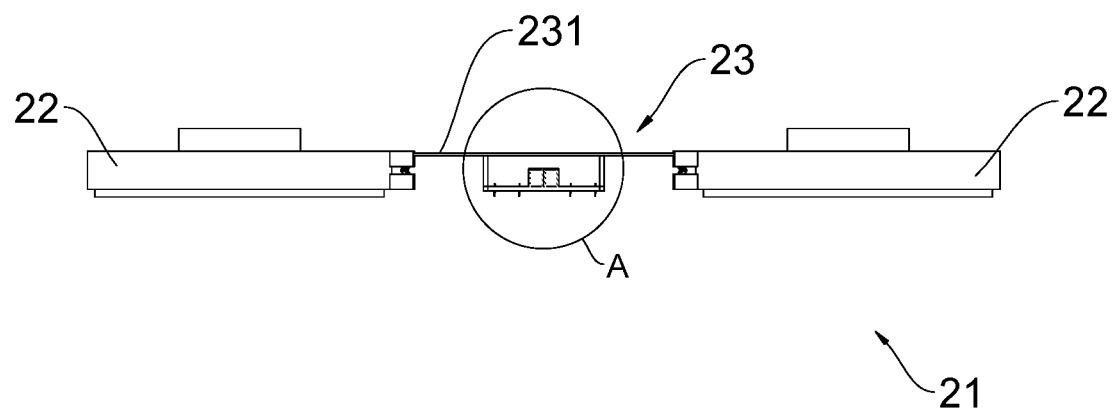
FIG. 4 is a schematic front view of an air-bearing assembly.
Figure 5:
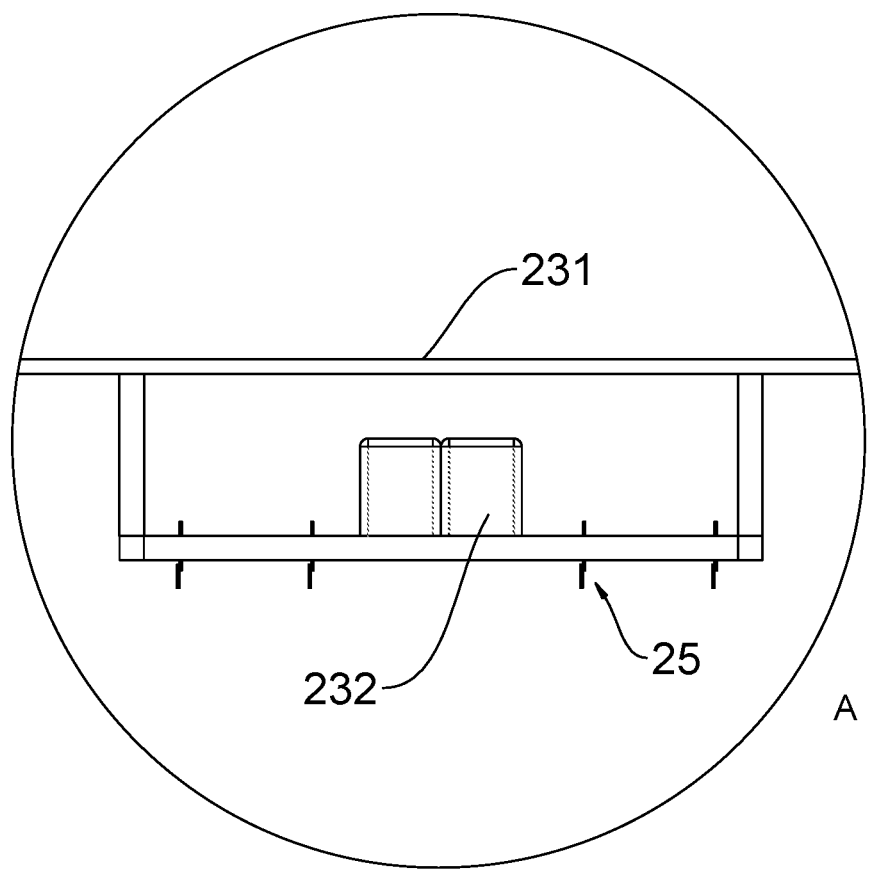
FIG. 5 is an enlarged schematic view of a part A in FIG. 4.
Figure 6:
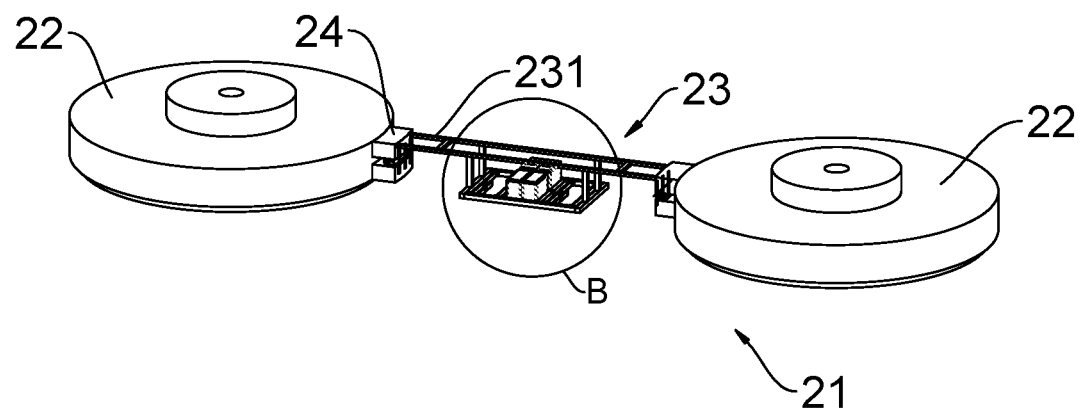
FIG. 6 is a schematic perspective view of the air-bearing assembly.
Figure 7:
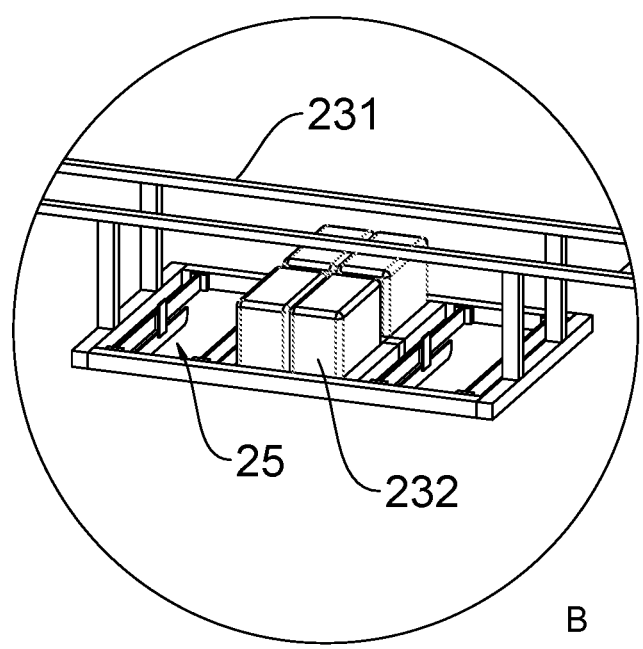
FIG. 7 is an enlarged schematic view of a part B in FIG. 6.
Figure 8:
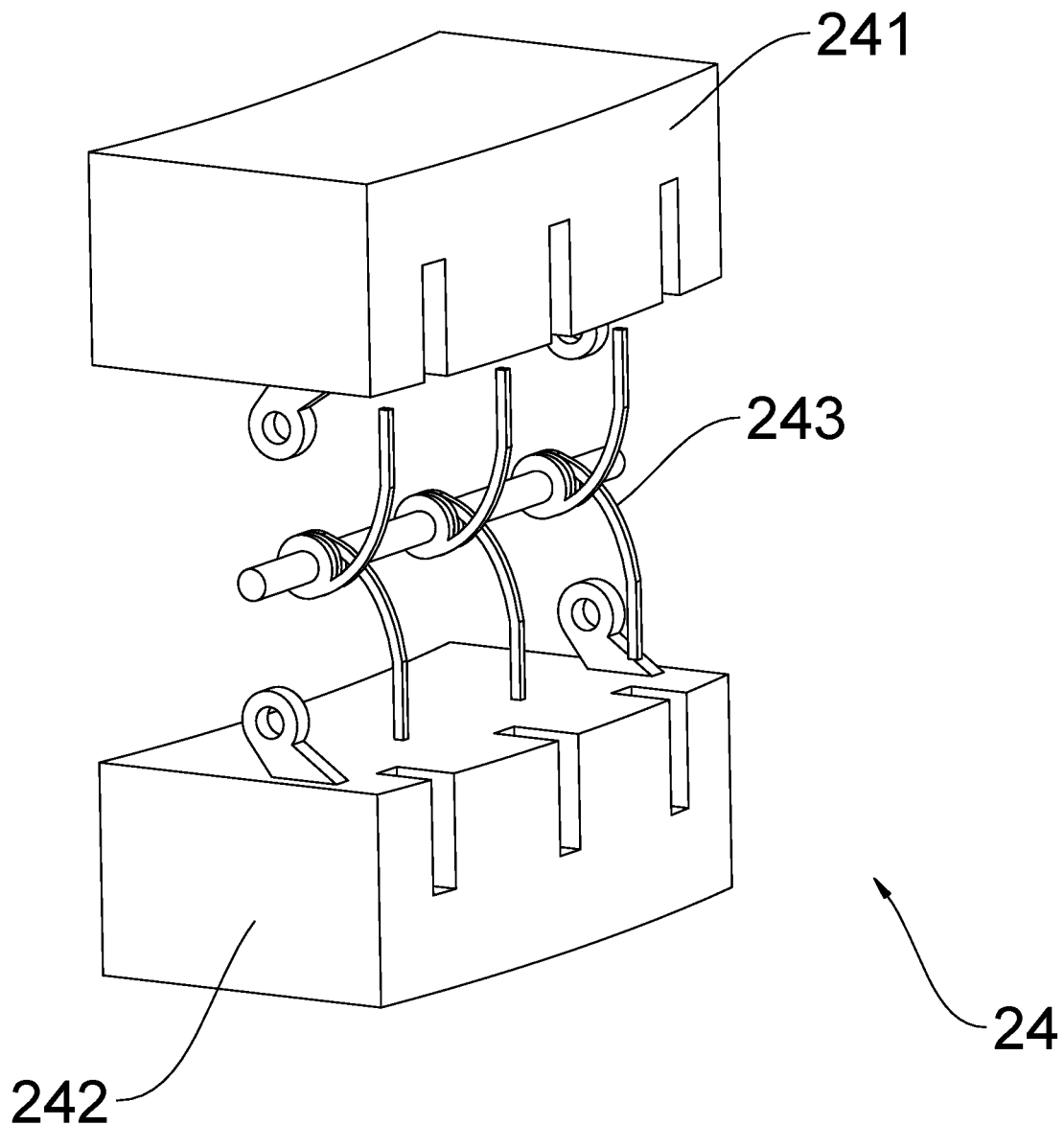
FIG. 8 is a schematic assembly view of a connector.
Figure 9:
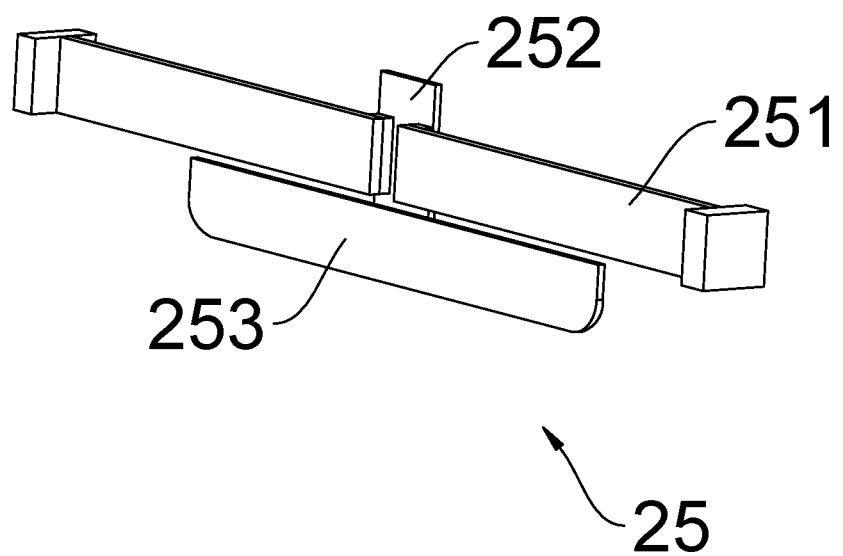
FIG. 9 is a schematic perspective view of a limiter.

As shown in FIGS. 1-3, a combinable multi-axis structure includes: a first air-bearing track 1, and a plurality of second air-bearing tracks 2 arranged in parallel and fitted with a plurality of air-bearing tables 3 capable of moving in a length direction of the plurality of second air-bearing tracks 2.

A plurality of mounting holes 31 are arranged in the plurality of air-bearing tables 3, and the first air-bearing track 1 is provided with a plurality of fasteners 11 corresponding to and fitted with the plurality of mounting holes 31 to connect the first air-bearing track 1 and the plurality of air-bearing tables 3.

Through the overall design of the combinable multi-axis structure, the first air-bearing track 1 and the plurality of air-bearing tables 3 are connected through the plurality of fasteners 11. Because of the plurality of second air-bearing tracks 2 arranged in parallel, the first air-bearing track 1 can be driven by the plurality of air-bearing tables 3 to move in the length direction of the plurality of second air-bearing tracks 2. The plurality of second air-bearing tracks 2 can achieve a more stable movement of the first air-bearing track 1, prevent an unsupported part in the middle of the first air-bearing track 1 from bending downwards under the action of gravity, and ensure levelness of the first air-bearing track 1, thereby achieving stability and high precision of a movement of an air-bearing table on the first air-bearing track 1. The fasteners 11 are used for connecting to the mounting holes 31 correspondingly, so as to achieve fastening connections between the first air-bearing track 1 and the air-bearing tables and improve stability of the first air-bearing track 1.

A vibration-absorbing assembly 32 is arranged in each mounting hole 31 and includes a first housing 321, the first housing 321 is provided with an opening at a top thereof and a second sealing plate 322 at a middle part therein, the second sealing plate 322 divides the first housing 321 into a first cavity 323 and a second cavity 324 from top to bottom, a moving plate 325 is arranged at a bottom surface of the second sealing plate 322, a supporting rod 326 is vertically arranged on an inner bottom side of the first housing 321, and a through hole 327 fitted with and used for housing the supporting rod 326 is arranged in the moving plate 325; and a connecting column 328 is arranged on a top surface of the second sealing plate 322, and an assembly 329 is arranged on a top side of the connecting column 328 and used for connecting to the fastener 11.

A top side of the first housing 321 is flush with a surface of the first air-bearing track 1, and a top side of the assembly 329 protrudes to a surface of the first air-bearing track 1 [sic].

Through the design of the vibration-absorbing assembly 32, the second sealing plate 322 can make the inside of the second cavity 324 a closed space, and a top of the first cavity 323 communicates with the outside. Since the assembly 329 is connected to the fastener 11, the first air-bearing track that is vibrated or changed in weight transmits the vibration or impact to the assembly through the fastener 11, and the vibration or impact is transmitted from the assembly 329 to the second sealing plate 322 along the supporting rod 326. It should be noted that, since the second sealing plate 322 is made of a flexible material, the second sealing plate 322 changes its own shape under the vibration or impact to cooperate with the vibration or impact, that is, the second sealing plate 322 moves up and down with the vibration or impact, and the second cavity 324 as the closed space applies an opposite force to the second sealing plate 322 to absorb the vibration or impact on the second sealing plate 322. In this process, the moving plate 325 that is arranged at a bottom side of the second sealing plate 322 moves with the second sealing plate 322. Since the through hole 327 that is fitted with the supporting rod 326 is arranged in the moving plate 325, the fitting between the supporting rod 326 and the through hole 327 can maintain levelness of the moving plate 325, and keep a horizontal position and the levelness stable while the moving plate 325 is moving up and down with the second sealing plate 322, thereby ensuring that the second sealing plate 322 only moves axially along the supporting rod 326. Thus, the assembly 329 is not displaced horizontally or changed in levelness while moving up and down. The above design can achieve the stability and levelness of the first air-bearing track 1, ensure that the vibration or impact generated by the first air-bearing track 1 can be absorbed by the buffer assembly while the first air-bearing track 1 is moving and when an object is placed on the air-bearing table of the first air-bearing track 1, and ensure the levelness of the first air-bearing track 1. At the same time, the vibration or impact generated by the first air-bearing track 1 can be prevented from being continuously transmitted downwards, that is, the vibration or impact of the first air-bearing track 1 can be prevented from affecting the stability of the air-bearing table 3, so that the stability and precision of the whole device can be improved.

Since the top side of the first housing 321 is flush with the surface of the first air-bearing track 1, and the top side of the assembly 329 protrudes to the surface of the first air-bearing track 1 [sic], a certain buffer space can be achieved during the movement or vibration of the second air-bearing track 2 [sic].

A first sealing plate 33 made of a flexible material is arranged on a top side of the first cavity 323.

Through the above design, the first sealing plate 33 is used for sealing the first cavity 323 to prevent impurities or dirt from entering the first cavity 323 from the opening at the top of the first cavity 323 in the process of absorbing the impact in the second cavity 324, thereby keeping the inside of the first cavity 323 clean, avoiding a damage to the second sealing plate 322 in a working process, and protecting the second sealing plate 322. Meanwhile, the flexible structure of the first sealing plate 33 can prevent the vibration or impact from being transmitted to the first housing 321.

A buffer ring body 34 is arranged on the top side of the first housing 321 and around the assembly 329, and a plurality of buffer pads 341 are arranged on both upper and lower surfaces of the buffer ring body 34.

Since the connection between the fastener 11 and the assembly 329 cannot effectively ensure that a bottom surface of the first air-bearing track 1 completely fits an upper surface of the air-bearing table 3, there are possibilities of a gap and looseness. Through the above design, the plurality of buffer pads 341 that are arranged on both upper and lower sides of the buffer ring body 34 abut against the top side of the first housing 321 and the bottom surface of the first air-bearing track 1, respectively, and the buffer ring body can act to tension and fill the gap. At the same time, a hole in the middle of the buffer ring body 34 limits displacement ranges, that is, movement ranges, of the fastener 11 and the assembly 329, and also limits a shaking range of the first air-bearing track 1, so that the buffer ring body 34 can ensure coaxiality between the fastener 11 and the assembly 329 and ensure that the fastener 11 and the assembly 329 remain vertical continuously in the assembled state. At the same time, since the first sealing plate 33 is flexible, the first sealing plate 33 is driven to be displaced when the fastener 11 and the assembly 329 are displaced. Thus, the deformed first sealing plate 33 can further limit the displacement of the fastener 11 and the assembly 329, and the first sealing plate 33 that is deformed towards an inner wall direction of the buffer ring body 34 can further improve the limiting effects on the fastener 11 and the assembly 329.

A linear motion platform having the above combinable multi-axis structure can have high stability, precision and impact absorptivity. At the same time, the plurality of second air-bearing tracks 2 are adopted to achieve a multi-axis mode, thereby ensuring the stability of the first air-bearing track 1. In addition, the first air-bearing track 1 and the air-bearing tables 3 located on the second air-bearing tracks 2 can achieve the combinable structure to improve convenience of the whole device in a transportation process.

Embodiment 2

As shown in FIGS. 4-9 and FIG. 11, a combinable multi-axis structure according to another embodiment of the present disclosure is different from Embodiment 1 in that, a plurality of air-bearing assemblies 21 are arranged on sides of the plurality of air-bearing tables 3 opposite to the plurality of second air-bearing tracks 2, and each air-bearing assembly 21 includes two air bearings 22 arranged oppositely and provided with a magnetic-absorbing assembly 23 therebetween; and the magnetic-absorbing assembly 23 includes a rack body 231 and a magnetic absorber 232 arranged at a middle part of the rack body 231, and both sides of the rack body 231 are connected to the air bearings 22 through connectors 24.

Through the above design, the air bearings 22 for the magnetic-absorbing assembly 23 are paired, and the magnetic-absorbing assembly 23 is arranged between opposite sides of the two air bearings 22. The paired air bearings 22 are used for delivering air. The second air-bearing track 2 can be fitted with the magnetic-absorbing assembly 23 to provide a magnetic preload effect, so that the magnetic-absorbing assembly 23 drives the air-bearing assembly 21 to fit the second air-bearing track 2. In this process, interaction forces between the magnetic-absorbing assembly 23 and the air bearings 22 counterbalance each other to ensure improved stability of airflows delivered from the air bearings 22 on both sides of the magnetic-absorbing assembly 23 and to ensure stable distances between the air bearings on both sides and the second air-bearing track 2. The air bearings 22 on both sides of the magnetic-absorbing assembly 23 are arranged symmetrically to further improve the stability. The magnitude of a magnetic force generated by the magnetic absorber 232 can be adjusted to change the magnitude of a suction force between the air-bearing assembly 21 and the second air-bearing track 2, thereby adjusting the distances between the air bearings 22 and the second air-bearing track 2.

Each connector 24 includes a first connecting block 241 and a second connecting block 242 that are rotationally connected through an elastic oscillator 243, the first connecting block 241 is connected to the air bearing 22, and the second connecting block 242 is connected to the rack body 231.

When each air bearing 22 works, the pressure and airflow of the air delivered from the air bearing 22 are changed to some extent. In this process, since the first connecting block 241 and the second connecting block 242 are connected to the air bearing 22 and the rack body 231, respectively, when the air delivered from the air bearing 22 changes, the air bearing 22 is displaced to be closer or farther away. Through an interaction between the magnetic-absorbing assembly 23 and the second rack body 231 [sic], the rack body 231 is not moved greatly with the displacement of the air bearing 22, but is relatively stable in a spatial position. At the same time, according to the elasticity of the elastic oscillator 243, the air bearing 22 tends to return to an original position. Thus, when the pressure and airflow of the air delivered from the air bearing 22 are changed, the position of the air bearing 22 can be restrained and stabilized to improve the precision and stability of the whole device.

The magnetic-absorbing assembly 23 further includes a limiter 25 including two enclosure racks 251 arranged oppositely, a connecting plate 252 is connected to opposite sides of the two enclosure racks 251, and a flexible plate 253 is arranged on one side of the connecting plate 252 close to the second air-bearing track 2; and outer ends of the enclosure racks 251 are connected to the rack body 231.

Through the above design, the flexible plate 253 can limit the air discharged from the air bearing 22. That is, when the air bearing 22 works, since the air bearing 22 is constantly delivering the air outwards, the flexible plate 253 can limit or interfere with a movement of the air generated by the air bearing 22 on one side towards the air bearing 22 on the other side when the air is passing through the magnetic absorber 232. This avoids the problem that the airflows from the two air bearings 22 collide with each other, causing an excessive local pressure and therefore causing unstable and changing distances between the air bearings 22 and the first and second tracks. At the same time, the design of the flexible plate 253 can avoid the situation that when the air bearings 22 stop air delivery, the magnet is directly adsorbed on the surfaces of the first and second air-bearing tracks 2, thereby easily causing the worn track surfaces.

Embodiment 3

Figure 10:
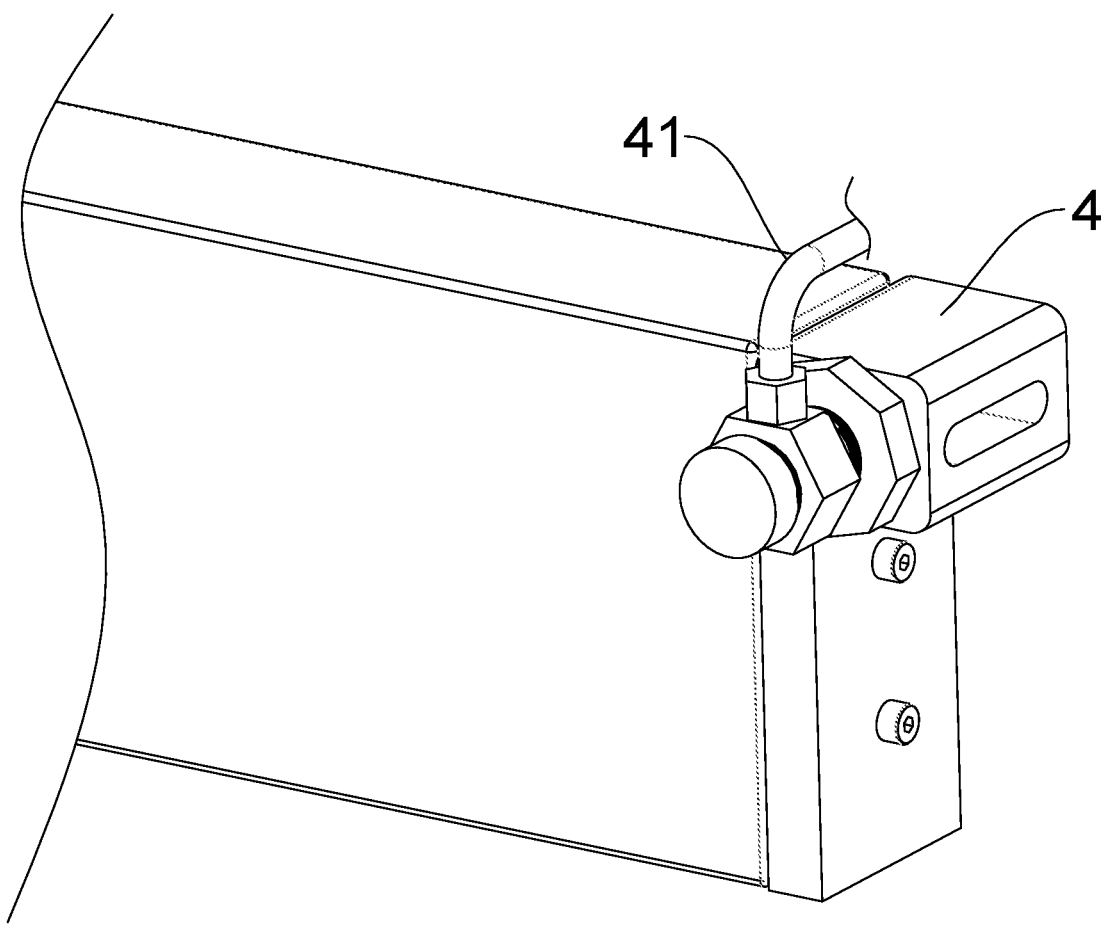
FIG. 10 is a schematic view of a suction substrate.
Figure 11:
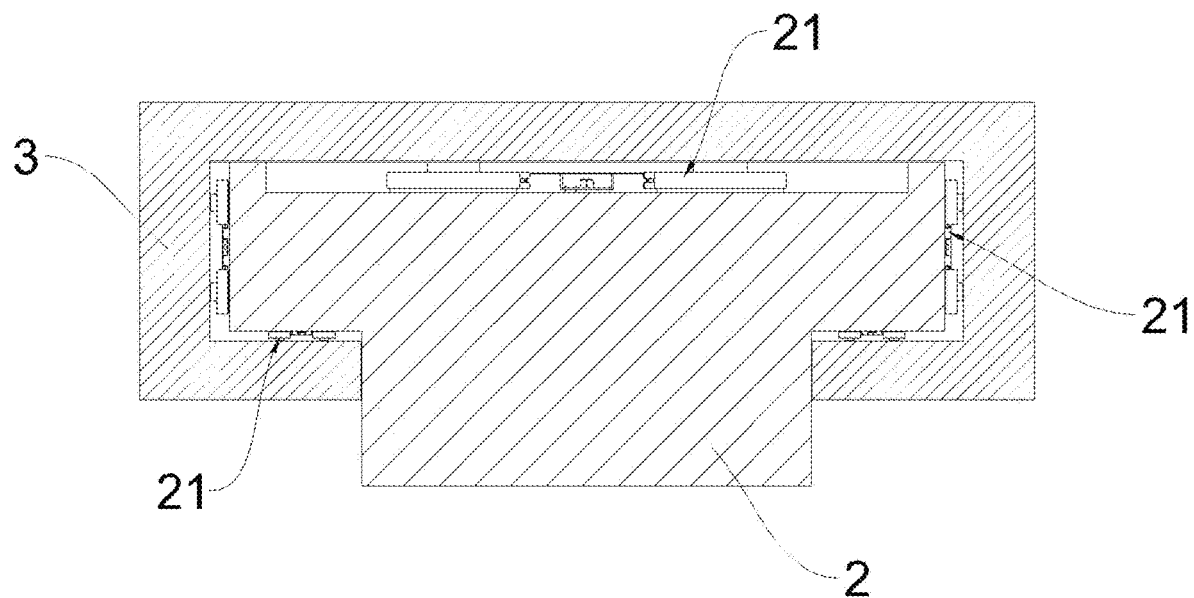
FIG. 11 is a schematic of the assembly structure of the air-bearing assembly, the air-bearing table and the second air-bearing tracks.

As shown in FIG. 10, a combinable multi-axis structure according to another embodiment of the present disclosure is different from Embodiment 1 in that, a suction substrate 4 is arranged at each end of the first air-bearing track 1 and the second air-bearing track 2, and an air pipe 41 is connected to one side of the suction substrate 4 and to an external air pump.

The air pump can cause the suction substrate 4 to suck the air on the surfaces of the first air-bearing track 1 and the second air-bearing track 2, thereby achieving the effect of cleaning the surfaces of the first air-bearing track 1 and the second air-bearing track 2, and meanwhile increasing fluidity of the air on the surfaces of the first air-bearing track 1 and the second air-bearing track 2 to avoid the problem that the fluidity of the air on the surfaces of the first air-bearing track 1 and the second air-bearing track 2 are decreased to result in slight fluctuations in the height and speed of the air-bearing table 3 during a movement. In addition, the suction substrate 4 can limit a sliding range of the air-bearing table 3 on the first air-bearing track 1 or the second air-bearing track 2, and prevent the air-bearing table 3 from sliding out of a movable range on the first air-bearing track 1 or the second air-bearing track 2.

Embodiment 4

As shown in FIG. 1, a linear motion platform having the above combinable multi-axis structure can have high stability, precision and impact absorptivity. At the same time, the plurality of second air-bearing tracks 2 are adopted to achieve a multi-axis mode, thereby ensuring the stability of the first air-bearing track 1. In addition, the first air-bearing track 1 and the air-bearing tables 3 located on the second air-bearing tracks 2 can achieve the combinable structure to improve convenience of the whole device in a transportation process.

The technical solutions of the present disclosure have been described in detail based on the above embodiments. It should be understood that the above embodiments are only specific embodiments of the present disclosure, and are not used for limiting the present disclosure. Any modification, supplement or similar substitution within the scope of the principles of the present disclosure should be included in the protection scope of the present disclosure.

What is claimed is:
1. A multi-axis structure, comprising: a first air-bearing track (1), and a plurality of second air-bearing tracks (2) arranged in parallel, wherein each of the plurality of second air-bearing tracks (2) is fitted with an air-bearing table (3) capable of moving in a length direction of the plurality of second air-bearing tracks (2); wherein, a plurality of mounting holes (31) are arranged in the air-bearing table (3), and the first air-bearing track (1) is provided with a plurality of fasteners (11) corresponding to and fitted with the plurality of mounting holes (31) to connect the first air-bearing track (1) with the air-bearing table (3);
  a vibration-absorbing assembly (32) is arranged in each mounting hole (31) and comprises a first housing (321), the first housing (321) is provided with an opening at a top thereof and a second sealing plate (322) at a middle part therein, the second sealing plate (322) divides the first housing (321) into a first cavity (323) and a second cavity (324) from top to bottom, a moving plate (325) is arranged at a bottom surface of the second sealing plate (322), a supporting rod (326) is vertically arranged on an inner bottom side of the first housing (321), and a through hole (327) fitted with and used for housing the supporting rod (326) is arranged in the moving plate (325);
  a connecting column (328) is arranged on a top surface of the second sealing plate (322), and an assembly (329) is arranged on a top side of the connecting column (328) and used for connecting to the fastener (11);

a top side of the assembly (329) protrudes from a surface of the air-bearing table (3); and a buffer ring body (34) is arranged on the top side of the first housing (321) and around the assembly (329), and a plurality of buffer pads (341) are arranged on both upper and lower surfaces of the buffer ring body (34).

2. The multi-axis structure according to claim 1, wherein, a first sealing plate (33) is arranged on a top side of the first cavity (323).

3. The multi-axis structure according to claim 1, wherein, at least two air-bearing assemblies (21) are arranged between each of the plurality of second air-bearing tracks (2) and the air-bearing table (3) fitted thereon, and the at least two air bearing assemblies each comprises two air bearings (22) arranged oppositely and provided with a magnetic-absorbing assembly (23) therebetween; and the magnetic-absorbing assembly (23) comprises a rack body (231) and a magnetic absorber (232) arranged at a middle part of the rack body (231), and two sides of the rack body (231) are connected to the two air bearings (22) through connectors (24).

4. The multi-axis structure according to claim 3, wherein, the connector (24) comprises a first connecting block (241) and a second connecting block (242) that are rotationally connected through an elastic oscillator (243), the first connecting block (241) is connected to the air bearing (22), and the second connecting block (242) is connected to the rack body (231).

5. The multi-axis structure according to claim 3, wherein, the magnetic-absorbing assembly (23) further comprises a limiter (25) comprising two enclosure racks (251) arranged oppositely, a connecting plate (252) is connected to opposite sides of the two enclosure racks (251), and a flexible plate (253) is arranged on one side of the connecting plate (252) close to the second air-bearing track (2); and outer ends of the enclosure racks (251) are connected to the rack body (231).

6. A linear motion platform having the multi-axis structure according to claim 1.

* * * * *